Patented Nov. 7, 1933

1,934,641

UNITED STATES PATENT OFFICE 1,934,641

SATIN WHITE

Harold Robert Rafton, Andover, Mass., assignor to Rafton Engineering Corporation, a corporation of Massachusetts No Drawing. Application July 18, 1930
Serial No. 468,988

7 Claims. (Cl. 91—68)

My invention relates to an improved satin white.

The principal object of my invention is to provide an improved satin white and paper coated therewith.

An important object is to provide an improved satin white from which oversize particles have been removed.

An important object is to provide an improved satin white from which the oversize particles have been substantially completely removed.

A further object is the production of an improved paper coated with ultra satin white.

Other objects and advantages of this invention will become apparent during the course of the following description.

Satin white is customarily made by the action of alum on lime, the lime being normally in excess. High calcium lime is usually employed, although at times lime containing magnesia has been employed for the purpose. Likewise on occasion calcium carbonate has been substituted for lime. Alum also has sometimes been substituted in whole or in part by other metallic salts but normally alum is the material used. Formerly it was the practice to use the true alums or double salts such as potash or ammonium alums but at the present time aluminum sulphate or alum is almost universally employed. Sometimes Glauber's salts (i. e. sodium sulphate with water of crystallization) is added in addition to the alum.

The composition of satin white is sometimes considered to be calcium sulphate and alumium hydroxide usually with an excess of calcium hydroxide, but certain evidence has been adduced which indicates that in some cases the composition may better be considered as a mixture of calcium sulphate and calcium aluminate, possibly with excess free lime. It will be understood that the material may vary from these compositions according to the raw materials used as explained above, according to the proportions in which the raw materials are used, and according to the method of manufacture employed.

Either of two methods are normally employed for the manufacture of satin white, which may be termed respectively the "thick" method and the "thin" method. The thick method consists in slaking lime into a relatively thick mud and then mixing this mud in a kneader or strongly constructed agitating vessel with lump or powdered alum, the alum being added usually in several stages, with intermittent water additions if desired as made necessary by the thickening of the mix. In the thin method the lime is slaked to a fluid milk and acted upon in a suitable container, preferably with agitation, either by powdered alum or preferably by alum in solution.

In the thick process it is customary to thin down the mix after reaction has been completed and to sieve it through a fine mesh wire cloth, usually 150 mesh, but sometimes 200 mesh is employed. The material is then dewatered as by filter pressing. In the thin method similar screening may be effected either on the original lime milk or on the reaction product or both, and the final reaction product is then dewatered as in the thick process.

As will be apparent there is always present in either method of manufacture a greater or lesser proportion of the base, that is the lime, as a solid phase during at least part of the reaction, and of course there is coincidentally present a certain amount of the base in dissolved condition. It is thus obvious that perfectly uniform crystal size cannot be expected to result under such conditions, such as would be the case if two clear solutions were caused to react. There will obviously be present certain crystals larger than the average, probably because of being formed on nuclei of the base, and in addition there will be more or less larger particles of slaked lime present, whether or not these be converted into the other compounds by surface action. Examination of various satin whites under the microscope confirms these statements. Satin white appears to consist of a more or less gelatinous mass interspersed with very fine crystals which for the most part appear to be of uniform size. The gelatinous material is difficult to see unless it is colored suitably. In addition to the crystals of uniform size there are normally present a certain number of larger crystals, and also a certain number of particles apparently of non-crystalline form varying from the finest up to particles which would just pass through the mesh used in processing the satin white. It is thus seen that satin white is not a material whose particles (excluding the gelatinous material) are strictly of a homogeneous size as produced, for in addition to the apparently gelatinous material and the fine crystals which constitute the large bulk of the product there exist certain relatively coarser crystals and a certain proportion of presumably non-crystalline material of varying particle sizes. I term the relatively uniform size crystals the "ultimate" particles of the satin white, although of course this term could be more strictly applied to the gelatinous mass which makes up a large proportion of the satin white. Inasmuch, however, as this gelatinous mass is not resolvable under the microscope into individual particles, the term "ultimate" particles will be reserved for the finely divided crystalline material present. In addition to the ultimate particles, then, the satin white contains particles ranging from the size of the ultimate particles up to the size of particles which have just passed through the mesh used in processing the material, either 150 or 200 mesh as the case may be.

For convenience I divide these remaining particles into two groups, the first of which I term "oversize" particles and the second of which I term the "intermediate".

I have found that there are certain difficulties inherent in the use of ordinary satin white for coating paper, and by careful study have determined that such difficulties arise from the presence in the satin white of the intermediate and oversize particles. I have found particularly that the difficulties are due to the presence of what I call the oversize particles, that is, particles larger than the certain limiting size, which size so far as I am aware has not been previously determined. By experimentation I have determined however, that this limiting particle size is approximately .001". All particles in the satin white which are greater than approximately .001" I have termed "oversize" particles whereas all particles between the oversize and the ultimate I have termed "intermediate", and in this description and appended claims the terms "oversize" and "intermediate" are to be considered as having the above defined meanings.

I have found that the oversize particles are very deleterious in satin white used for coating paper as they cause lumps in the coating of the paper with subsequent dusting during the drying, reeling and calendering operations, and are a cause of unevenness of finish and non-uniformity of the printing qualities of the resulting paper.

The intermediate particles are not detrimental in the sense that the oversize is detrimental, but the percentage of them present as well as their average size influence the general characteristics imparted to coated paper by satin white.

It is thus evident that reduction of oversize particles in satin white is greatly to be desired. Attempt has been previously made to reduce the so-called "grit" in satin white by grinding as in a pebble mill and this method if carried far enough will completely reduce and thus eliminate the oversize. But in so doing it also reduces the other particle sizes, that is, the intermediate and the ultimate, with the result that the general characteristics of the satin white are profoundly modified which in certain cases is very undesirable. The effect of such grinding is not to render the satin white completely homogeneous as to particle size but rather to move the curve of particle size distribution toward smaller sizes, each particle being progressively reduced. Furthermore the grinding method has the disadvantage of discoloring the satin white especially in the case of the severe treatment required to completely reduce all the oversize. Other methods such as elutriation and hydroseparation have been tried in an attempt to remove the oversize of satin white, but these methods do not remove sufficient oversize so that a suitable quality of satin white may be produced thereby. Moreover the best types of apparatus required for such methods are very large and expensive, require excessive floor space and involve reconcentration of solids from the necessarily dilute suspensions in which hydroseparation is required to be effected. Air flotation methods are likewise not feasible because not only do they not produce the quality of material desired, but also such methods require drying, and this is not only costly but produces a material which is extremely difficult if not virtually impossible to bring back to its original colloidal condition when desired for use.

In my copending application Serial No. 468,987, filed July 18, 1930, I have described satin white, the oversize particles of which have been reduced or substantially eliminated by either of two special methods, which results in satin white which I have termed "homogenized" satin white, having a substantially decreased or completely eliminated percentage of oversize, an increased percentage of intermediate, and a substantially unaffected percentage of ultimate. Whereas homogenized satin white is satisfactory to use and produces an improved paper coated with satin white, I have found that in some instances the "homogenizing" treatment modifies the quality of the satin white so homogenized so that whereas it is improved, the improved paper produced therewith does not possess certain characteristics which are sometimes desirable. This seems to be due in a considerable measure to the fact that by the homogenizing treatment the number of particles of intermediate sizes are increased. It is also due to some extent to the fact that part of the oversize may consist of objectionable off-color particles which are comminuted, and thus retained in the filler.

As stated previously, while the intermediate particles are not detrimental in the sense that the oversize particles are detrimental, still they do influence markedly in certain cases the character of paper coated with satin white containing an increased percentage of intermediate.

For example whereas paper coated with satin white in which the proportion of intermediate has been increased by homogenization will be smooth and of good finish, I have found nevertheless that it will not take so high nor so uniform a finish as will paper coated with satin white otherwise similar except containing a lesser degree of intermediate particles. Likewise the ink absorption of the former paper is somewhat greater than that of paper coated with satin white containing a lesser number of intermediate particles and the printing results of the former paper are not so sharp nor so clean cut as on the latter paper.

As result of an extended research I have devised a novel method whereby the oversize particles of satin white may be substantially completely removed without thereby changing the proportion of intermediate or ultimate particles which existed in the original untreated satin white and without thereby changing the particle sizes either of the intermediate or the ultimate such as would result in a grinding operation (e. g. in a pebble mill) as explained above.

The method I employ is to pass the satin white, preferably in liquid suspension, through a plated fine mesh wire cloth such as described in my copending application Serial No. 420,794, filed January 14, 1930. The proper concentration of such suspension may readily be determined by trial. As explained in my copending application, commercial screening has heretofore been confined to wire cloth of 150 mesh or approximately 200 mesh in some cases. Only rarely have finer meshes been used owing to both frailty of the wire cloth in the finer meshes as well as to the cost. However, using my new plated fine mesh wire cloth it is now feasible to pass materials commercially through cloths with openings corresponding to meshes finer than any hitherto commercially used and even finer than any hitherto made. Thus I may pass my satin white through a plated fine mesh cloth with openings approximately .001″ or somewhat less. This would correspond approximately to a wire cloth of 575 mesh, which is finer than any wire cloth which to my knowledge has hitherto been made.

I may use any convenient screening machine equipped with my plated wire cloth for the purpose, but I have found that the gyratory riddle screen pan disclosed in my copending application Serial No. 359,943, filed May 2, 1929, is particularly suitable.

I may pass the satin white after it has been produced through the plated wire cloth, or I may pass the base, from which the satin white is to be made, in liquid suspension prior to the actual formation of the satin white through the wire cloth. The point of passage of either the base or the satin white produced therefrom through the wire cloth is carried out at the point which is determined as most feasible in each individual case. However, I have found that very satisfactory results are obtained when my process is applied to the satin white reaction mix after the reaction has been completed, at which point it is normally in relatively dilute suspension (thin method) or is converted thereto (thick method).

The characteristics of satin white so processed are novel and well defined, namely, the particle size of the ultimate and intermediate particles have been unchanged and the proportion of ultimate to intermediate has remained also substantially unchanged, except in the case where plated wire cloth with openings of less than .001″ has been employed, in which case a certain portion of the larger intermediate particles will have been removed. The main difference between the processed satin white and the original satin white is that the range of particle size has been restricted through the substantial elimination of the oversize. There is no increase in percentage of intermediate as in the case with homogenized satin white. Likewise there is no reduction in the ultimate particle size, and thus the production of excessively fine or colloidal particles is avoided which is an important disadvantage in certain cases in the quality of satin white produced where grinding procedures are used. Moreover by my treatment for removing oversize particles the color (whiteness) of satin white may be improved by removal of off-color oversize particles, a point of very great importance as the economic value of satin white is greatly influenced by its color. In contradistinction, the color of satin white is substantially unimproved by homogenization and very appreciably reduced by grinding. It will thus be seen that my improved satin white has qualities different from any heretofore produced and is characterized by the fact that the particle size distribution has been limited by the substantial elimination of the oversize without substantially any changes taking place in the particle sizes of the intermediate or the ultimate or any change in the proportion of the intermediate to the ultimate, except in the case as noted above where part of the larger intermediate particles may be removed. Its color may also have been improved.

The plated fine mesh wire cloths I use, extending the range of separation of fine particles as they do, I have termed "ultra wire cloths".

My novel satin white processed through ultra wire cloth as described and/or possessing the characteristics herein described I have termed "ultra satin white".

I have found that paper coated with ultra satin white (mixed with suitable adhesive of course, such as the customary adhesives ordinarily employed for the purpose, for example casein, as disclosed (among other places) by Belle in his article on page 445 of the January 1, 1925 issue of "Paper", and with or without other mineral pigments as desired) has a better finish, is more uniform in finish, in certain instances can be made with less adhesive, thereby having the double advantages of more economical production and higher surface gloss, prints more evenly, and may have a better color than paper coated with either ordinary satin white or homogenized satin white.

As my novel satin white, i. e. ultra satin white, is relatively inexpensive to produce, it is apparent that its invention will result in the production of improved quality coated papers, without substantial price increase.

It will be apparent that it is not possible to produce a fine mesh wire cloth as a base cloth for plating with all the openings absolutely uniform in size. For this reason, if it be desired to produce satin white substantially free from oversize, it will be apparent that the average cloth opening must necessarily be somewhat less than approximately .001″, in order that the maximum opening may not be greater than approximately .001″. As ultra wire cloths decrease markedly in capacity as their size of opening decreases, it is sometimes desirable from the standpoint of economy, in order to increase the capacity of the screening apparatus, to use wire cloths with openings of such size that they do not remove the oversize completely, for example ultra wire cloths with openings averaging approximately .001″ or in certain cases slightly larger.

Thus although it is theoretically and practically desirable to remove all the oversize, nevertheless I have found that the reduction of oversize from that amount normally occurring (which in various cases ranges from approximately 1.5% up to several per cent. by weight) improves the quality of satin white. Although such satin white is of course not of such good quality as satin white from which the oversize has been completely removed, nevertheless I have found that satin white containing not more than approximately three-fourths per cent. oversize (the larger oversize of course being removed and the oversize remaining thus representing only the smaller oversize) is of quality greatly superior to that of satin white which contains a normal percentage of oversize, and produces substantially improved coated paper which in certain cases where cost is all important meets the requirements satisfactorily; and therefore such improved satin white is meant to be included in my term "ultra satin white".

Where I use the word "paper" herein I use it in the broad sense to include products of manufacture of all types and of all weights and thicknesses which contain as an essential constituent a considerable amount of prepared fibre and which are capable of being produced on a Fourdrinier, cylinder, or other forming, felting, shaping or molding machine; and by "coated paper" I mean any one of these products which is coated.

While I have described in detail the preferred embodiments of my invention it is to be understood that my invention may be varied considerably within the limitations required by the disclosures of the prior art without departing from the spirit of my invention or the scope of the subjoined claims.

I claim:

1. The method of producing improved satin white from satin white having oversize, intermediate, and ultimate particles, which comprises reducing the quantity of the particles exceeding .001" in size to an amount not exceeding approximately three-fourths of one per cent. by weight of the total satin white, and maintaining the ultimate and intermediate particles in substantially the same size and in substantially the same proportion one to the other as the ultimate and intermediate particles in the satin white employed in producing said improved satin white.

2. The method of producing improved satin white from satin white having oversize, intermediate, and ultimate particles, which comprises substantially eliminating particles exceeding .001" in size, while maintaining the ultimate and intermediate particles in substantially the same size and in substantially the same proportion one to the other as the ultimate and intermediate particles in the satin white employed in producing said improved satin white.

3. The method of producing improved satin white from satin white having oversize, intermediate, and ultimate particles, which comprises substantially eliminating particles exceeding .001" in size, maintaining the ultimate and intermediate particles in substantially the same size as the ultimate and intermediate particles in the satin white employed in producing said improved satin white, and maintaining a proportion of intermediate to ultimate particles no greater than substantially the proportion of the intermediate to ultimate particles in said employed satin white.

4. The method of producing coated paper comprising fibrous body stock and a coating comprising adhesive and improved satin white produced from satin white having oversize, intermediate, and ultimate particles, which comprises reducing the quantity of the particles exceeding .001" in size to an amount not exceeding approximately three-fourths of one per cent. by weight of the total satin white, and maintaining the ultimate and intermediate particles in substantially the same size and in substantially the same proportion one to the other as the ultimate and intermediate particles in the satin white employed in producing said improved satin white, and applying said improved satin white and said adhesive to said fibrous body stock.

5. The method of producing coated paper comprising fibrous body stock, and a coating comprising adhesive and improved satin white produced from satin white having oversize, intermediate, and ultimate particles, which comprises substantially eliminating particles exceeding .001" in size, while maintaining the ultimate and intermediate particles in substantially the same size and in substantially the same proportion one to the other as the ultimate and intermediate particles in the satin white employed in producing said improved satin white, and applying said improved satin white and said adhesive to said fibrous body stock.

6. The method of producing coated paper comprising fibrous body stock, and a coating comprising adhesive and improved satin white produced from satin white having oversize, intermediate, and ultimate particles, which comprises substantially eliminating particles exceeding .001" in size, maintaining the ultimate and intermediate particles in substantially the same size as the ultimate and intermediate particles in the satin white employed in producing said improved satin white, and maintaining a proportion of intermediate to ultimate particles no greater than substantially the proportion of the intermediate to ultimate particles in said employed satin white, and applying said improved satin white and said adhesive to said fibrous body stock.

7. Improved satin white produced from satin white having oversize, intermediate, and ultimate particles, characterized by the fact that it does not contain in excess of three-fourths of one per cent. by weight of the total satin white of particles exceeding .001" in size, that the ultimate and intermediate particles are of substantially the same size as the ultimate and intermediate particles in the satin white employed in producing said improved satin white, and that the proportion of intermediate to ultimate particles is no greater than substantially the proportion of the intermediate to ultimate particles in said employed satin white.

HAROLD ROBERT RAFTON.